J. H. BILLMEYER.
Potato Digger.
No. 102,479. Patented May 3, 1870.
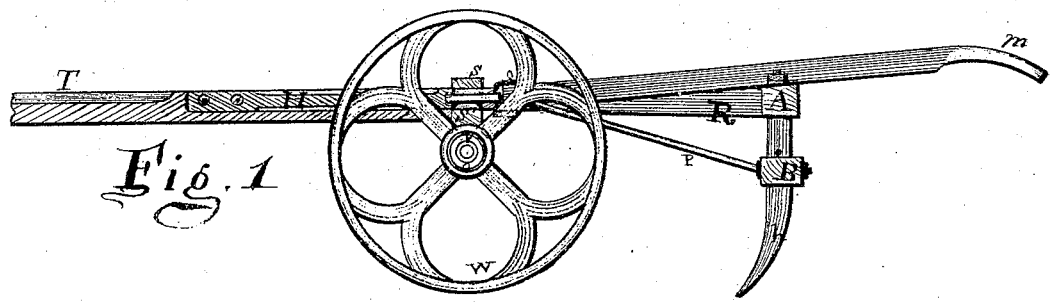
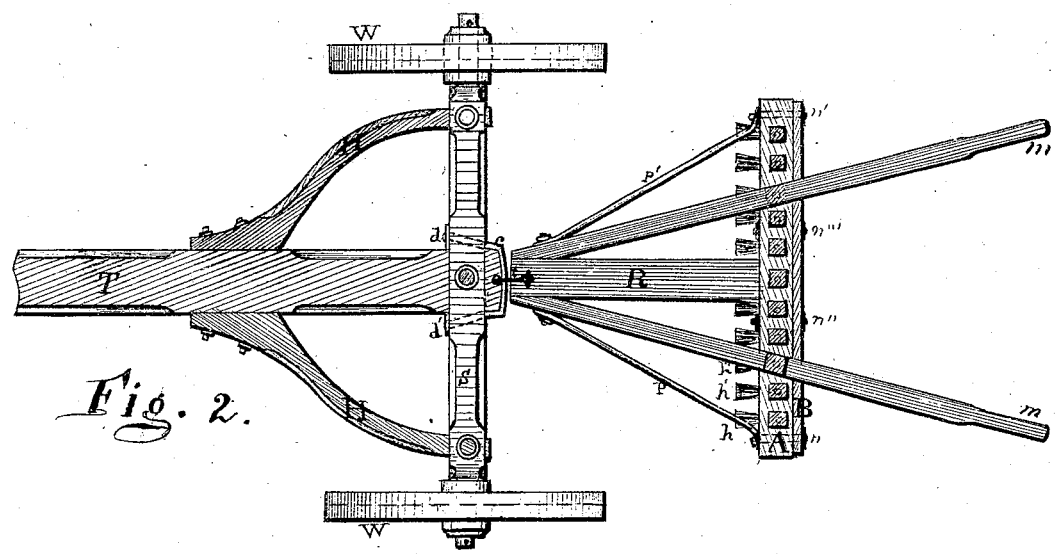
Witnesses:
J. J. Stevenson
H. J. Scout
Inventor:
Joseph H. Billmeyer

UNITED STATES PATENT OFFICE.

JOSEPH H. BILLMEYER, OF RAISIN, MICHIGAN.

IMPROVED POTATO-DIGGER.

Specification forming part of Letters Patent No. 102,479, dated May 3, 1870.

*To all whom it may concern:*

Be it known that I, JOSEPH H. BILLMEYER, of Raisin, in the county of Lenawee and State of Michigan, have invented certain Improvements in Potato-Diggers, of which the following is a specification.

The nature of my invention consists in attaching to a pair of wheels a long-toothed double-headed rake provided with handles to guide it, and with which to force it down and raise it up at every hill as the machine is drawn along.

In the drawings, Figure 1 is a side elevation of a machine embodying my invention. Fig. 2 is a view of the same as seen from a point directly above.

T is the tongue, to which the horses are hitched. S' is the axle-tree, mounted upon the wheels W. S is the bolster, bolsted to the axle-tree above the tongue and hounds H. $c$ is a clevis around the rear end of the tongue, and passing forward between the bolster and axle-tree, and sustained there by the nut and washer $d$ $d'$. $t$ is another clevis, which engages with the former, and connects the truck-wheels with the long-toothed double-headed rake. A and B are the two cross-heads of the rake. R is the draw-beam, attached to the upper head, A. B is the head below, braced by the wire braces P and P', to insure stiffness to the teeth $h$ $h'$ $h''$. These cross-heads are provided with any suitable number of vertical teeth, (in this case eleven,) with which to break up the hill and separate the potatoes from the soil. The teeth are constructed after the general form shown in the drawings, the lower points being slightly flattened and made correspondingly wider, and their rear edges thinner than the front edges, to prevent clogging and the better to bring up the under soil. As the machine is drawn along, the rake-teeth $h$ $h'$ $h''$, &c., are not to be left continuously to be dragged along in the ground, like those of a cultivator, but the operator, having hold of the handles $m$ and $m$, thrusts the teeth into the earth on nearing each hill, and raises them up on leaving it, thus elevating each hill without disturbing the earth between. The beam R is made short, so as to shorten the machine and bring the teeth or potato-hooks $h$ $h'$ $h''$ as nearly as possible to the truck, in order to cause the lower points of the potato-hooks $h$ $h'$ $h''$ to throw back and drop the hill when the handles are raised.

What I claim as my invention is—

The potato hooks or teeth $h$ $h'$ $h''$, supported by the double heads A and B and beam R, to be operated by the handles $m$ $m$, in connection with the trucks, all arranged in the manner and for the purposes set forth and described.

JOSEPH H. BILLMEYER.

Attest:
W. I. SCANT,
J. I. STEVENSON.